(12) United States Patent
Albeck et al.

(10) Patent No.: US 6,629,345 B2
(45) Date of Patent: Oct. 7, 2003

(54) CHUCKING DEVICE

(75) Inventors: Bernhard Albeck, Lorch-Waldhausen (DE); Tobias Albeck, Lorch-Waldhausen (DE)

(73) Assignee: Albeck GmbH, Waiblingen-Neustadt (DE)

( * ) Notice: Subject to any disclaimer, the term of this patent is extended or adjusted under 35 U.S.C. 154(b) by 0 days.

(21) Appl. No.: 09/949,609

(22) Filed: Sep. 10, 2001

(65) Prior Publication Data

US 2002/0069498 A1 Jun. 13, 2002

(30) Foreign Application Priority Data

Sep. 12, 2000 (DE) .......................................... 100 44 915

(51) Int. Cl.⁷ ............................... B23Q 5/22; B23C 9/00
(52) U.S. Cl. ...................... 29/38 R; 29/33 P; 29/38 B; 29/38 C; 269/900; 409/219; 409/224; 451/403; 451/414
(58) Field of Search ...................... 29/48.5 R, 48.5 A, 29/38 R, 38 B, 38 C, 38 P; 409/219, 221, 224; 74/813 R, 813 L, 813 C, 826; 451/403, 414; 269/900

(56) References Cited

U.S. PATENT DOCUMENTS

| | | |
|---|---|---|
| 3,049,032 A | 8/1962 | Schabot |
| 3,146,640 A | 9/1964 | Moncreif |
| 3,718,055 A * | 2/1973 | Maier ........................ 74/813 L |
| 3,846,912 A | 11/1974 | Newbould |
| 3,908,484 A | 9/1975 | Degen et al. |
| 4,353,271 A * | 10/1982 | Pieczulewski ............ 74/813 L |
| 4,380,939 A * | 4/1983 | Gardner .................... 198/345.2 |
| 4,706,351 A * | 11/1987 | Chuang ...................... 29/35.5 |
| 4,972,744 A * | 11/1990 | Sauter et al. ................ 29/35.5 |
| 5,450,771 A * | 9/1995 | Carter et al. .............. 74/813 L |
| 5,682,658 A * | 11/1997 | Roseliep .................. 29/48.5 A |
| 6,185,802 B1 | 1/2001 | Gruber et al. |

FOREIGN PATENT DOCUMENTS

| | | |
|---|---|---|
| DE | 32 09 512 A1 | 10/1982 |
| DE | 32 39 556 A1 | 9/1983 |
| DE | 198 40 942 C1 | 3/2000 |

* cited by examiner

Primary Examiner—William Briggs
(74) Attorney, Agent, or Firm—Frishauf, Holtz, Goodman & Chick, P.C.

(57) ABSTRACT

A chucking device, in particular for workpieces that are to be machined on more than one side, has a workpiece carrier with at least one turret, arranged to receive workpieces, that is supported rotatably about an axis of rotation on the workpiece carrier, A positive-engagement locking device is associated with the turret, on the workpiece carrier, by which locking device the turret can be locked positionally precisely in a predetermined rotary angle position relative to the workpiece carrier. The locking device has at least three locking parts disposed coaxially to one another, which on the plane faces facing one another each carry pairs of cooperating locking means that can be brought into and out of engagement with one another by means of an axial relative motion of the locking parts.

19 Claims, 7 Drawing Sheets

CHUCKING DEVICE

FIELD OF THE INVENTION

The invention relates to a chucking device, in particular for workpieces that are to be machined on more than one side, having a workpiece carrier; at least one turret or workpiece holding table, arranged to receive workpieces, which is supported, rotatably about an axis of rotation, on the workpiece carrier; and a positive-engagement locking device, associated with the turret, on the workpiece carrier, by which locking device the turret can be locked positionally precisely in a predetermined rotary angle position relative to the workpiece carrier.

BACKGROUND OF THE INVENTION

From U.S. Pat. No. 6,185,802, a multiple chucking device for workpieces to be machined on more than one side is known, which has an elongated workpiece carrier of polygonal cross section that has at least two chucking faces extending parallel to its central longitudinal axis, and which on at least one side is rotatably supported about its longitudinal axis by 360° in stationary bearing means. At least two turrets are disposed side by side in a row on each of its chucking faces. All the turrets are coupled by positive engagement by gear means to one another and to a common drive source, in such a way that as a function of a rotary motion of the workpiece carrier about its central longitudinal axis, all the turrets are rotated about their respective axes of rotation by a predetermined angular value that is dependent on the rotation of the workpiece carrier.

Each of the turrets is assigned a positive-engagement locking device on the workpiece carrier, by which locking device the turret and thus the workpiece clamped to it can be locked positionally correctly in a predetermined rotary angle position relative to the workpiece carrier. To that end, the locking device has two annular locking parts, coaxial to one another, which each carry one serration, as a locking means, on the plane faces facing one another, and of which a first locking part is bolted to the turret, and the second locking part is connected to the workpiece carrier in a manner fixed against relative rotation. By means of actuating means with a pressure-medium-actuated reciprocating cylinder (hydraulic cylinder), the two serrations can be brought out of engagement, so that the turrets coupled by positive engagement to a common drive source via gear means can be adjusted, each by the same angle of rotation about its central longitudinal axis, as a function of a rotary motion of the workpiece carrier. After a new rotary angle position has been set, the serrations of the two locking parts are brought back into engagement with one another, so that for the ensuing machining of the workpieces clamped to them, the turrets are locked exactly positionally correctly and rigidly against the workpiece carrier.

The advantage of this embodiment of the turrets with locking parts that carry serrations is that the serrations assure optimal indexing precision and centering. Thus during the workpiece machining, close-tolerance, exact positioning of each turret exists relative to the workpiece carrier, and the connection between the turret and the workpiece carrier allows high force to be transmitted and at the same time offers high precision. At the same time, stringent demands for precision are made of neither the drive device, which when the gears are out of engagement with one another puts each of the turrets into a new position relative to the workpiece carrier, or in other words executes an indexing operation, nor the elements of the drive device that generate the rotary motion. It suffices for the drive device to bring the respective turret close enough to the desired angular position that the two gears mesh positionally correctly with one another upon the locking of the turret.

To assure the precisely positionally correct mutual engagement of the gears upon locking of the turrets that have been rotated approximately to a new angular position, a tooth size or tooth pitch of the gears is required that with certainty allows the existing angular position tolerances in the rotary motion of the turrets to be compensated for. With this condition, the maximum possible number of teeth in the gears is limited; that is, the tooth pitch must not fall below a minimum value that is dependent on the dimensions of the locking parts. As a result, angular pitches of less than approximately 1° are hardly feasible in practical terms. However, there are instances in machining in which the workpieces clamped to the turrets must be rotated, between machining operations, by angular values that are less than 1°, for instance.

From U.S. Pat. No. 3,846,912, an indexing mechanism is known, which has a plurality of indexing disks disposed coaxially to one another that have gears with different tooth pitches, which can be brought selectively into and out of engagement by axial relative motions of the indexing disks. Thus a workpiece disposed on one of the disks can be rotated by very small angular increments about the disk axis on the vernier principle, and locked by positive engagement, exactly positionally correctly, in the particular angular position desired. The patent does not disclose any constructional details of an indexing device for which this indexing mechanism could be used.

An incremental rotation and fixation of a chucking plate, supported in a housing rotatably about its center axis is permitted by a round indexing table described in German Patent Disclosures DE-A1 32 09 519 and DE-A1 32 39 556. This round indexing table has a positive-engagement locking device, with four pairs of cooperating gear rings, of which two ring gears, located in the same plane, are embodied on an annular piston that is supported rotatably and axially displaceably in the housing, coaxially to the chucking plate. By a suitable axial displacement of the annular piston, its two gear rings can be brought into and out of engagement with the gear rings associated with them, in order to lock the chucking plate exactly positionally correctly in the particular desired angular position against the housing, and unlock it in order to set a different angular position. While the indexing table does make it possible to achieve indexing increments by the vernier effect of fractions of degrees for the chucking plate, nevertheless to that end it requires two separate drive mechanisms for the chucking plate and for the annular piston. Both drive mechanisms must have their own control devices, so that they can each approach the particular desired angular position of the chucking plate. Indexing tables of this type are therefore complicated in construction, and because of their design and the requisite drive elements, they are unsuited to being built in large numbers into one common workpiece carrier, as is required in multiple chucking devices for simultaneously machining a plurality of identical workpieces.

SUMMARY OF THE INVENTION

It is one object of the present invention to create a chucking device of the type defined at the outset whose turret can be rotated by small incremental angular steps, in particular of less than 1° each, and then positioned fixedly, without requiring additional positioning drive mechanisms and controls; the chucking device should be distinguished by a simple, space-saving design and thus allowing versatility in use.

For attaining this and other objects, one aspect of the present invention is directed to a chucking device having a work piece carrier and at least one turret, arranged to receive workpieces, which is supported, rotatably about an axis of rotation, on the workpiece carrier. A positive-engagement locking device on the workpiece carrier, associated with the at least one turret, has at least three locking parts coaxial to one another, of which a first locking part is solidly connected to the turret and a second locking part is solidly connected to the workpiece carrier, and at least one third locking part is disposed between the first locking part and the second locking part and is supported rotatably relative to the workpiece carrier, and all the locking parts, on faces facing one another, each carry pairs of cooperating locking means which can be brought into and out of engagement with one another by means of an axial relative motion of the locking parts. The chucking device also includes actuating means for bringing the locking means of the locking parts selectively into and out of engagement in such a way that the at least one third locking part, via its locking means, always remains positively locked with at least one locking part adjacent to it. A drive device, which is coupled to the turret, serves to rotate the turret by a predetermined angular value about its axis of rotation when the locking means are released.

Thus the turret can be put into a respective new desired angular position, in which it is subsequently positioned exactly positionally correctly by the provision that, by means of the actuating means, the locking means are brought by positive engagement into engagement with one another.

Various specific features can also be provided. For example, as a rule, each of the locking means has a crown gear, in particular a serration, but embodiments are also conceivable in which positive-engagement locking means in the form of suitably disposed prisms, perforated disks with indexing bolts, and so forth are used.

Also, the third locking part disposed between the first and second locking parts is advantageously embodied as an annular disk, which on both facing plane sides carries respective locking means, preferably in the form of a crown gear and in particular a serration. This third locking part is advantageously rotatably supported with radial play, or in other words with limited radial mobility between the first and second locking parts. This loose disposition of the third locking part assures that the gears associated with one another, which as a rule are embodied as gear rings, can upon entering into engagement with one another center one another unhindered and can mesh with one another, so that the high precision of positioning of the locking parts and thus of the turret remains assured. The intrinsically loosely supported third locking part, both in the lifting motion of the turret to undo its locking and in the ensuing rotary motion for shifting into a new angular position, always remains kept in engagement with either the first or the second locking part, and therefore it always has a controlled position, determined beforehand, relative to the turret or the workpiece carrier, as is necessary for the replicable setting of a predetermined rotary angle value for the position of the turret. The crown gear of the first locking part and the crown gear, associated with it, of the third locking part have a different tooth pitch from the crown gear of the second locking part and the crown gear, associated with it, of the third locking part. By a suitable choice of the tooth pitches (or of the pitches of the differently designed locking means), a very fine incremental rotary angle positioning of the turret can be performed, in which the rotary angle increments amount to merely fractions of 1°, as will be explained in further detail in the ensuing description of an exemplary embodiment.

Also, the novel chucking device can in principle be used as an indexing device or round indexing table with only one turret, but because of its simple, space-saving design and the fact that it requires only a single drive device for the turret and requires no additional drive and control devices for indexing disks and the like, it is especially suitable for use as well in the form of a multiple chucking device. To that end, the workpiece carrier can be designed as polygonal in cross section and can have at least two chucking faces, extending parallel to its longitudinal axis, with at least one turret disposed on each chucking face.

In a fundamentally similar embodiment to that described in U.S. Pat. No. 6,185,802, a multiple chucking device of this nature can have one common drive source for all the turrets of the drive device, with which source the gear means of the turrets are coupled by positive engagement, so that upon a rotation of the workpiece carrier about its central longitudinal axis, all the turrets disposed on the workpiece carrier are rotated simultaneously about their respective axes of rotation by the same angle of rotation, which is in a fixed relationship to the angle of rotation of the workpiece carrier about its central longitudinal axis. The invention thus makes it possible for the multiple chucking device known from U.S. Pat. No. 6,185,802 to be improved and refined by simple means, without changing the outside dimensions and without substantially increasing the expense for control or driving, in such a way that it permits incremental indexing motions of the turrets by fractions of degrees. This is attained without impairing the strength and loadability of the turrets or the workpiece carrier, or of other elements serving to support and move these parts.

DETAILED DESCRIPTION OF THE DRAWINGS

The multiple chucking device shown in the drawings as an exemplary embodiment is composed of a number of individual chucking devices, which are disposed in a common workpiece carrier. The invention is not limited to such multiple chucking devices but instead also includes individual chucking devices, which can be embodied in the form of indexing devices, indexing apparatuses, or round indexing tables, given suitable design of the applicable workpiece carrier or housing. The exemplary embodiment shown serves the purpose solely of providing better comprehension of the invention, without limiting the invention.

Figure 1:
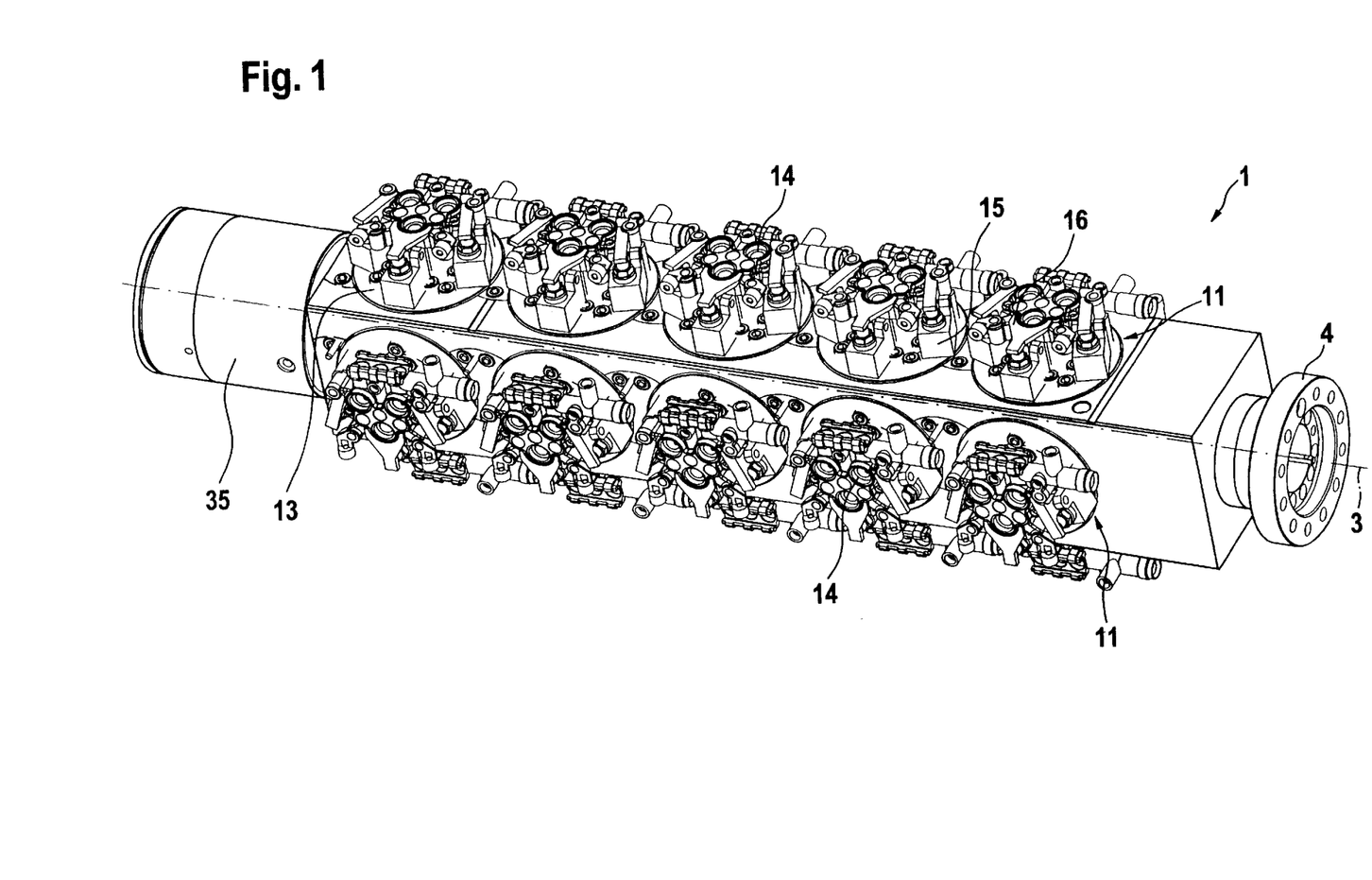
FIG. 1 is a perspective view of a multiple chucking device of the invention.
Figure 2:
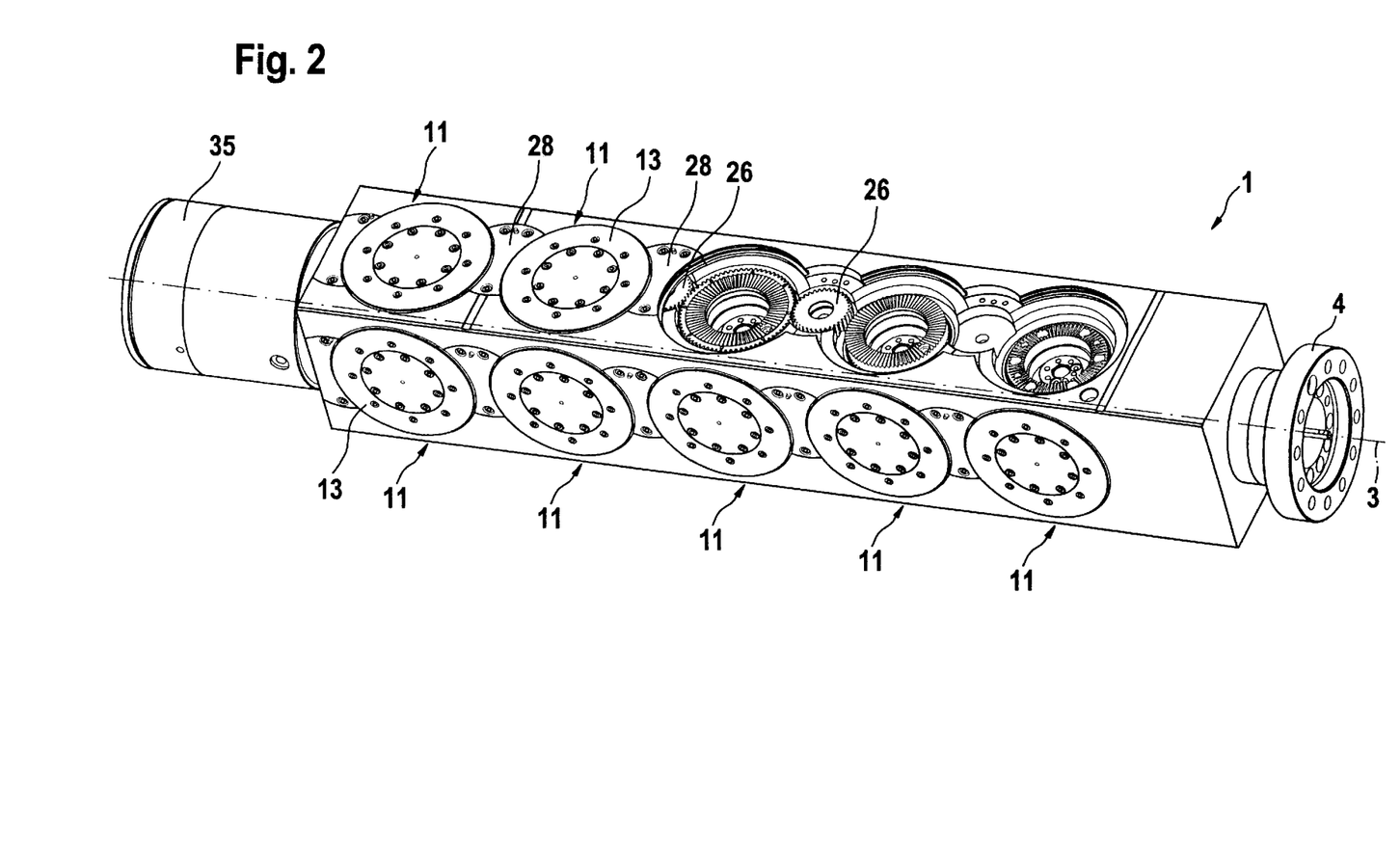
FIG. 2 is a corresponding perspective view of the multiple chucking device of FIG. 1, with some of the turrets removed and showing different serrations.

As seen particularly from FIGS. 1, 2, the multiple chucking device shown has an elongated, beamlike workpiece carrier 1 of square cross section, whose four side faces, parallel to one another in pairs, form chucking faces 2. The workpiece carrier 1, which can have some other polygonal cross-sectional shape, such as the shape of a rectangle, an equilateral triangle, a hexagon, and so forth, has a connecting flange 4, screwed onto one face end, coaxially to its central longitudinal axis 3, with which flange it is connected, in the manner visible from FIG. 4, to a receiving peg 5 of a CNC machining center, not otherwise shown. The receiving peg 5 is imparted a rotary or indexing motion about the central longitudinal axis 3 by a round indexing device, not shown, of the CNC machining center, which allows the workpiece carrier 1 to rotate about its central longitudinal axis in such a way that its chucking faces 2 are each aligned with the tools of individual machining stations distributed annularly around the multiple chucking device, in the manner known from CNC machining centers.

Figure 3:
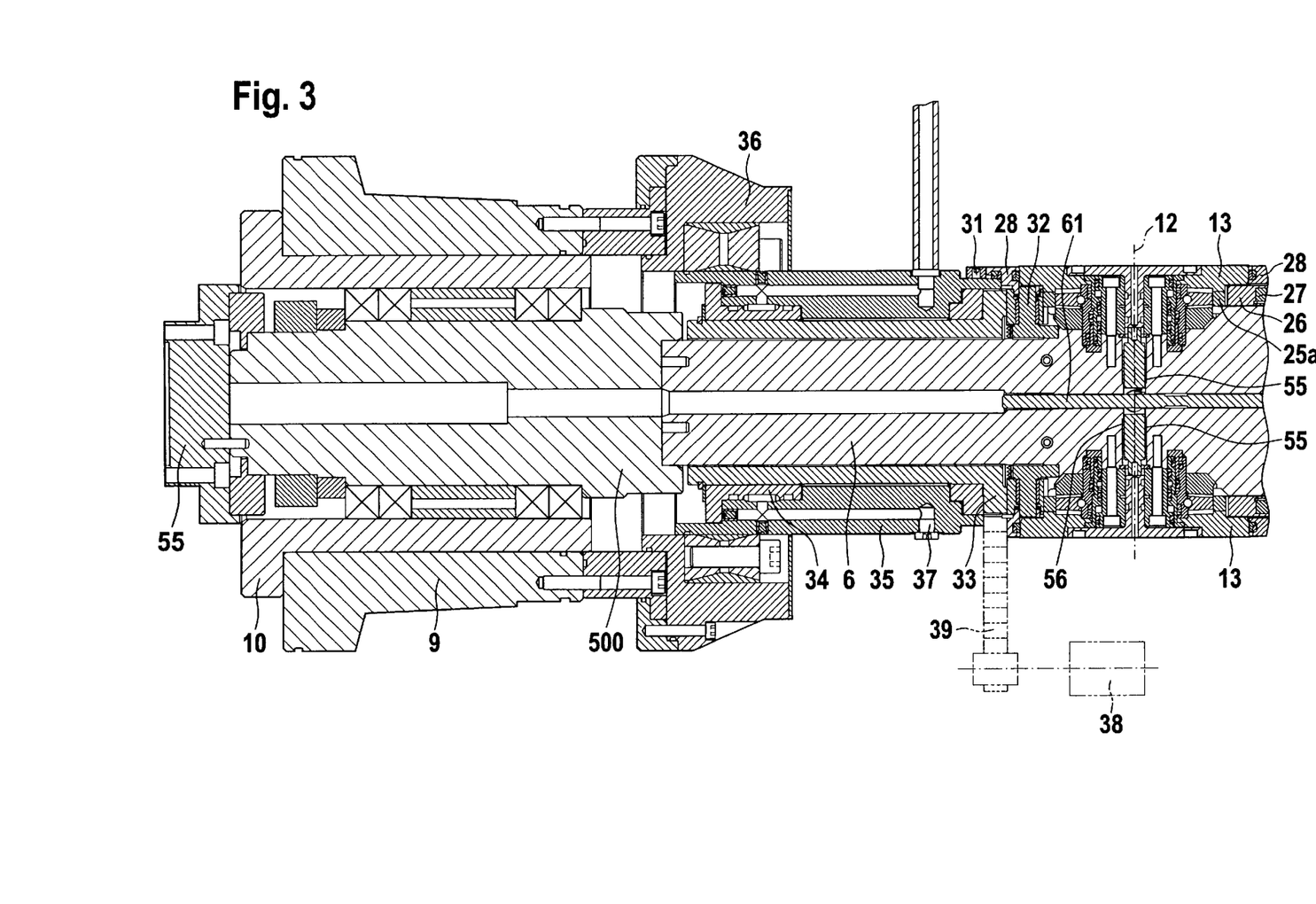
FIG. 3 shows a side view in axial longitudinal section on a different scale, showing a detail of its drive device.

On its opposite face end, the workpiece carrier 1 is screwed to a coaxial receiving flange 500, visible in FIG. 3, which solidly connects a formed-on coaxial, cylindrical bearing peg 6 of the workpiece carrier 1 to a coaxial, cylindrical bearing part 7. Via roller bearings and a bearing bush 10, the bearing part 7 is rotatably supported in a stationary bearing receptacle 9 that forms a component part of the CNC machining center. The receiving peg 5 (FIG. 4) and the bearing receptacle 9 (FIG. 3) of the CNC machining center form stationary bearing means in which the workpiece carrier 1 is supported so as to be rotatable by 360° about its central longitudinal axis 3. Depending on the design of the CNC machining center, the central longitudinal axis 3 can be oriented horizontally or vertically.

Figure 4:
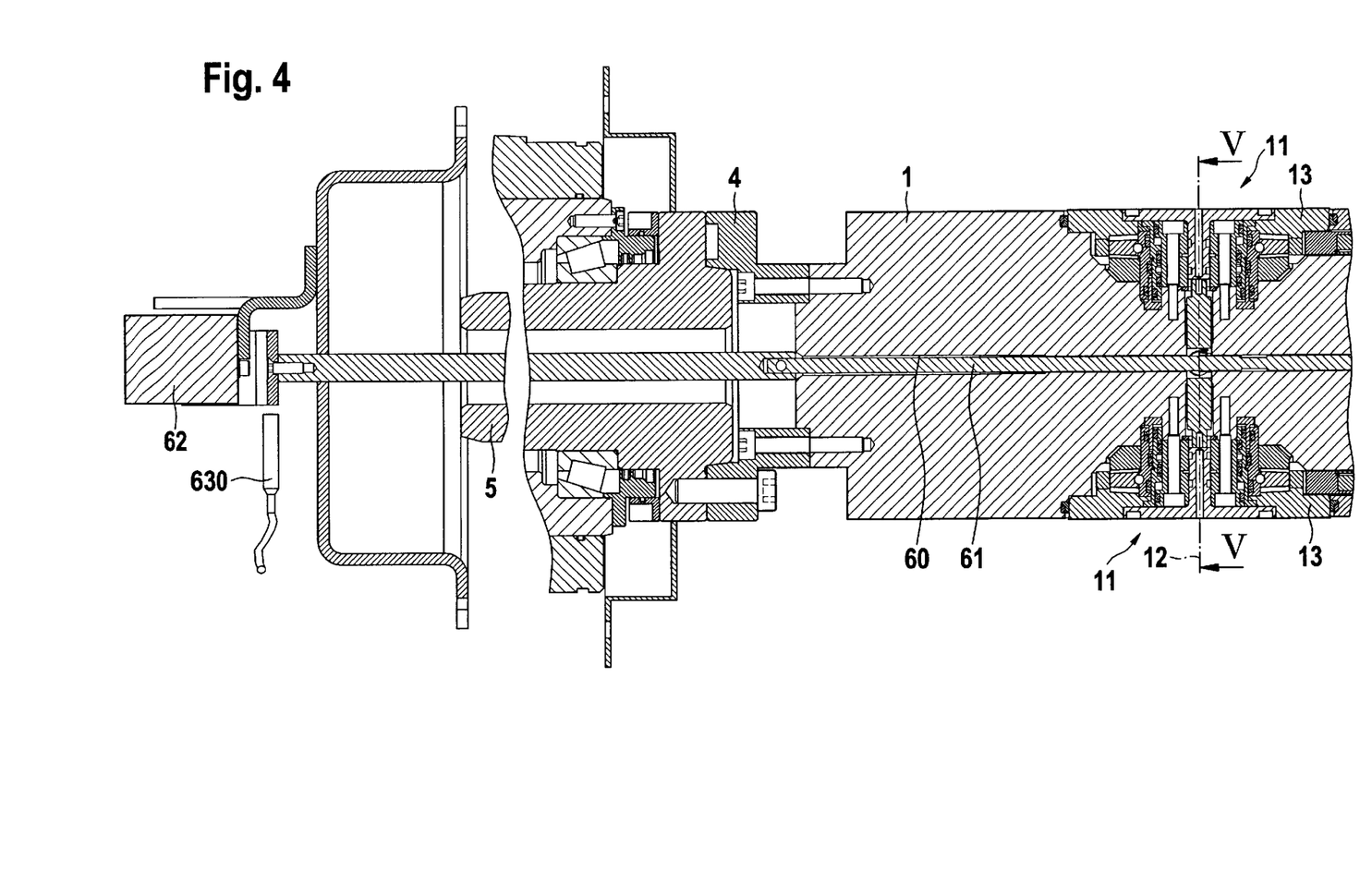
FIG. 4 shows a side view in axial longitudinal section on a different scale, showing a detail of its feeler device.

In the exemplary embodiment shown, there are twenty turrets, or workpiece holding tables 11, supported rotatably, each about its own axis of rotation 12 (see FIG. 5), on the workpiece carrier 1. Each of the turrets 11 has a disk-like receiving plate 13 and is arranged to receive workpieces that are to be machined, of the kind indicated for instance at 14 in FIG. 1. For chucking the respective workpiece 14, it has hydraulic chucking devices 15, which as can be seen from FIGS. 1 and 6 each have clamping levers 16 that are pivotable about a shaft structurally connected to the plate and these levers can be pivoted by hydraulic cylinders 17. The hydraulic supply to the hydraulic cylinders 17 is effected in each case via a pressure medium conduit 18, disposed in the receiving plate 13, whose supply of pressure medium is not shown further in detail. On each of the chucking faces 2, there are five turrets 11 arranged in a row, spaced equally apart from one another; as shown for instance in FIGS. 3, 4 and 6, the axes of rotation 12 of each row are located in a common plane, which in FIGS. 3 and 4 is the plane of the drawing paper and which includes the central longitudinal axis 3 of the workpiece carrier 1. As can be seen from FIGS. 1 and 5, four turrets 11 of the four receiving faces 2 are always located in one common transverse plane, which extends perpendicular to the central longitudinal axis 3 of the workpiece carrier 1.

Figure 5:
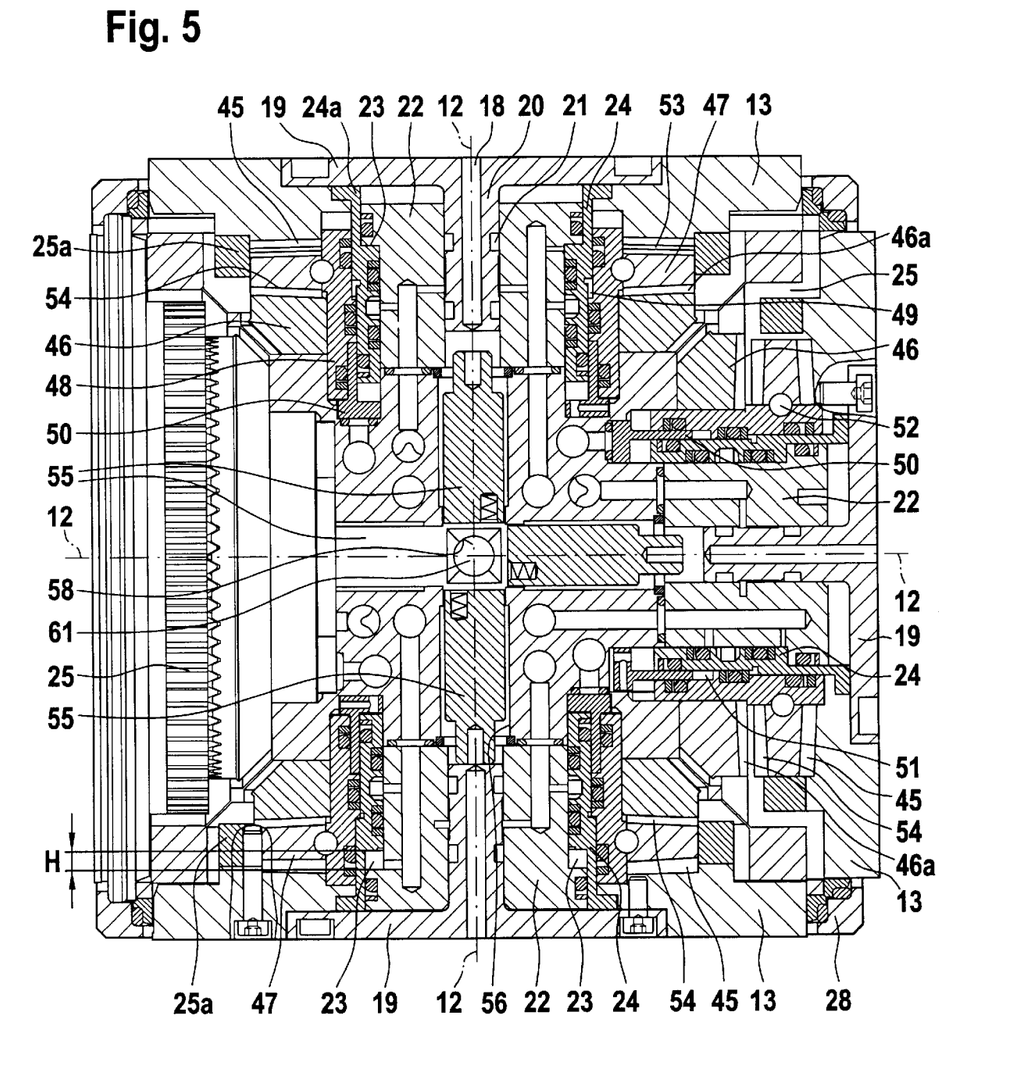
FIG. 5 is a side view of the multiple chucking device of FIG. 1, in section along the line V—V of FIG. 4, showing various operating states of the four turrets shown.
Figure 6:
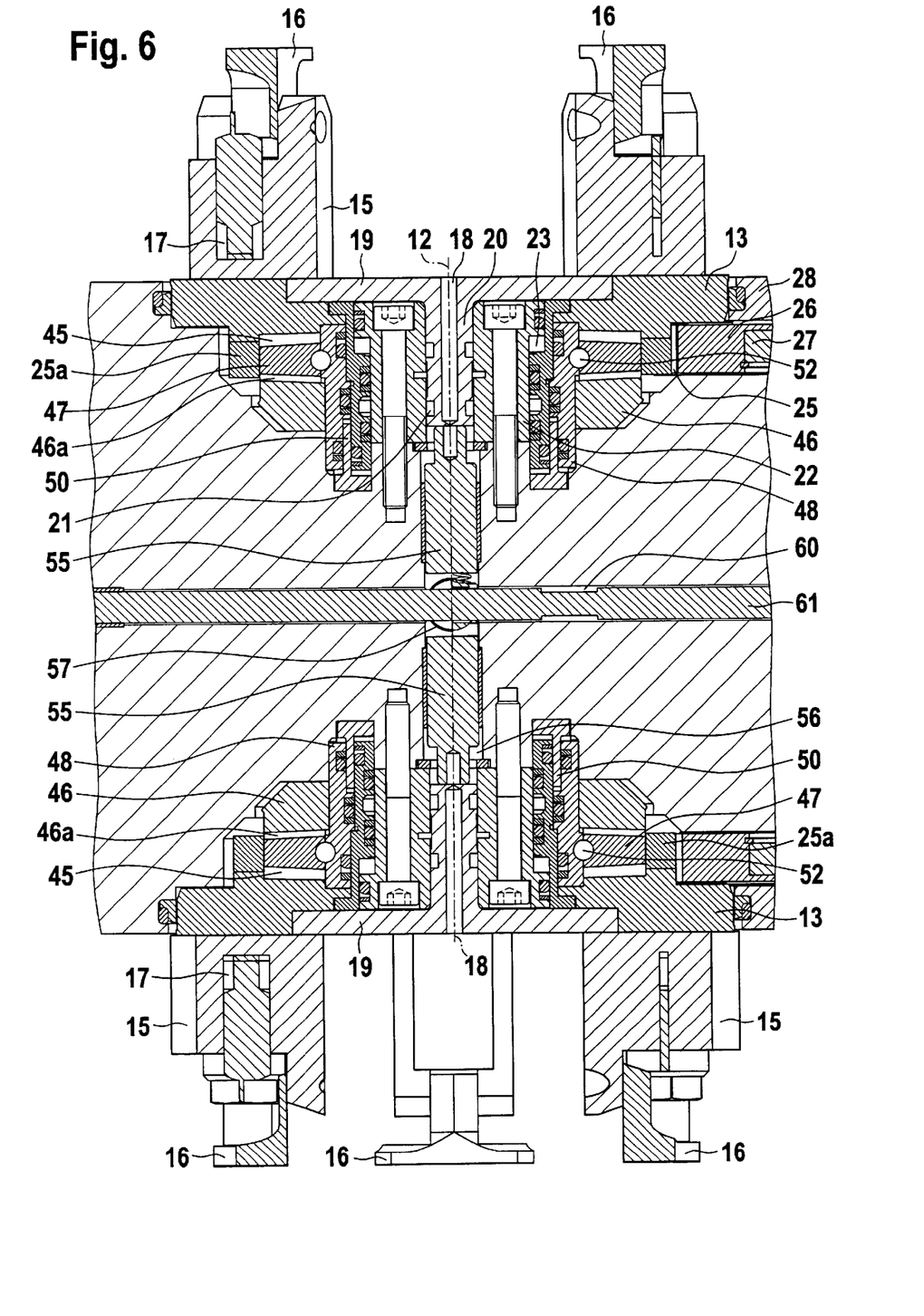
FIG. 6 shows a side view in axial longitudinal section on a different scale, showing a detail of two turrets, facing one another.
Figure 7:
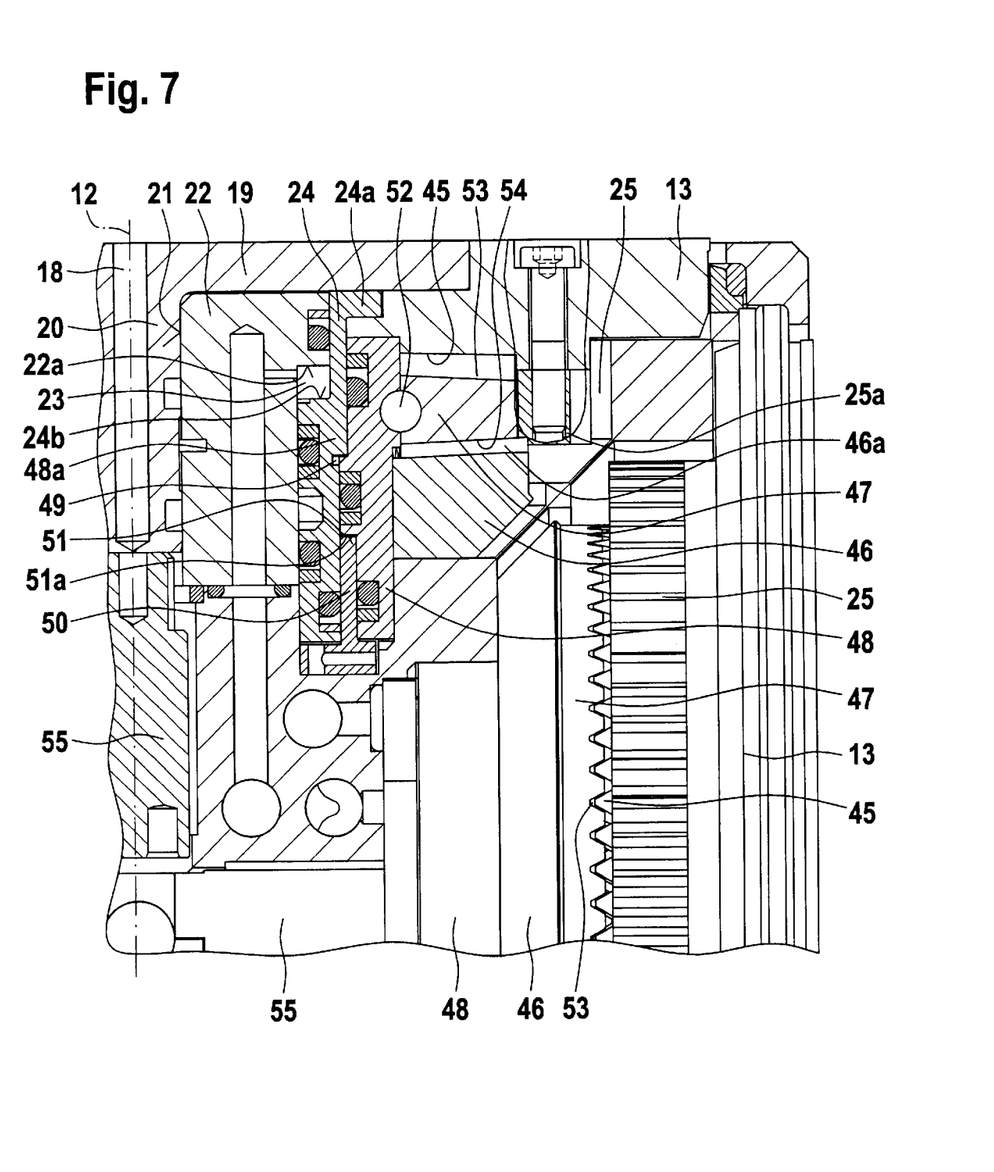
FIG. 7 shows a reciprocating cylinder arrangement of the multiple chucking device of FIG. 6, in a corresponding fragmentary view and on a different scale.

By means of a coaxial bearing peg 20, formed onto a platelike connecting element 19 that is screwed to the receiving plate 13, the receiving plate 13 of each of the turrets 11 is supported freely rotatably, in the manner seen for instance in FIGS. 5, 6 and 7, in a corresponding bearing bore 21 of a piston 22 that is bolted in sealed fashion to the workpiece carrier 1. The piston 22 is surrounded by a cylinder sleeve 24 sealed off from it and displaceable axially relative to it, thus forming a cylinder chamber 23, and this sleeve is rotatably connected to the receiving plate 13 via an annular flange 24a, which is supported with play between the connecting element 19 and the receiving plate 13. The cylinder chamber 23 is dimensioned such that, in the exemplary embodiment shown, it allows the receiving plate 13 an axial stroke H of a maximum of about 4 mm relative to the piston 22 (see FIG. 5). The receiving plate 13 is provided on its underside with a gear ring 25a, which is bolted to the receiving plate 13 and carries a coaxial spur gear 25.

As best seen from FIGS. 1, 2 and 6, one intermediate gear wheel 26 is disposed between each pair of adjacent turrets 11 in one row and is supported rotatably, via a needle bearing, on a cylindrical bearing bolt 27 that is connected to the workpiece carrier 1. The interstice located between two adjacent receiving plates 13 of one row of turrets 11 is closed by a cover element 28, as seen for instance from FIGS. 1 and 2.

The spur gears 25, connected to the receiving plates 13 via the gear rings 25a, which mesh with the intermediate gear wheels 26 each disposed between two adjacent turrets, form gear means, which assure that all the receiving plates 13 of one row of turrets 11 will execute a necessarily synchronized, identical rotary motion about their respective pivot axes 12.

The spur gear 25 of the receiving plate 13 at the end adjacent to the bearing receptacle 9 of each row of turrets 11 meshes with a connecting gear wheel 31, which is supported freely rotatably on a bearing peg 32 of the workpiece carrier 1, as can be seen from FIG. 3. The connecting gear wheels 31 of the four rows of turrets 11 disposed on the four receiving faces 2 mesh with a common, coaxial drive gear wheel 33, which is embodied as a crown wheel and is supported freely rotatably on the cylindrical bearing peg 6 of the workpiece carrier 1. The drive gear wheel 33, which forms a common drive source, is surrounded by a hydraulically expandable clamping sleeve 34, which is disposed in a cylindrical clamping sleeve carrier 35 that is braced against a retaining flange 36 in a manner fixed against relative rotation, and the retaining flange is in turn bolted to the bearing receptacle 9.

The clamping sleeve 34, which can be subjected to pressure medium in a controlled way via a hydraulic connection 37, allows the common drive gear wheel 33 to be fixed in a manner that prevents relative rotation with respect to the bearing receptacle 9 and thus to the machine frame of the CNC machining unit. In an alternative embodiment, the drive gear wheel 33 can also be coupled to its own drive device, for instance in the form of an electric geared motor 38 controlled by the control unit of the CNC machining unit, the coupling being effected for instance via a synchronous belt drive 39. The electric geared motor 38 allows the drive gear wheel 33 to be set into revolution relative to the workpiece carrier 1 and thus allows all the turrets 11 to be driven simultaneously at the same angular speed. This makes it possible to have the workpieces 14 revolve while they are being machined and thus makes it possible to create a fifth machining axis. In addition, however, it also possible for the drive gear wheel 33 and thus all the turrets 11 to be rotated in common, as a function of a program, by predetermined angular values, if this is expedient or necessary in view of the particular machining situation of the workpieces or the setting of their angular positions. For further details, see U.S. Pat. No. 6,185,802.

In the multiple chucking device shown in the drawing, each of the turrets 11 is assigned one positive-engagement locking device on the workpiece carrier 1, by means of which during machining, whichever workpiece 14 is clamped can be locked in a predetermined rotary angle position, exactly positionally correctly relative to the workpiece carrier. The details of this mechanical locking device can be seen best in FIGS. 5, 6 and 7.

The receiving plate 13 of each of the turrets 11 is not only rotatable in sealed fashion with the bearing peg 20 of its connecting element 19 in the associated bearing bore 21 of the piston 22 bolted to the workpiece carrier 1, but is also supported in a way capable of limited axial displacement. On its underside, on an annular face oriented toward the workpiece carrier 1, adjoining the gear ring 25a on the inside, it has a crown gear in the form of a so-called Hirth serration 45, which forms first locking means on the receiving plate 13, which in turn represents a first locking part.

Opposite the receiving plate 13 and spaced apart from it, a coaxial gear ring 46 is screwed to the workpiece carrier 1; on the plane face toward the receiving plate 13, this gear ring has a second crown gear in the form of a second serration 46a, which forms second locking means on the gear ring 46 serving as a second locking element. The tooth pitches of the two serrations 45, 46a differ from one another.

A third locking part in the form of an indexing disk 47 is disposed in the interstice between the underside of the receiving plate 13 and the gear ring 46; it surrounds an annular cylinder 48, which is seated in sealed fashion and axially displaceably on the cylinder sleeve 24 and with it defines an annularly encompassing cylinder chamber 49. On the side remote from the receiving plate 13, an annular piston 50 rigidly connected to the workpiece carrier 1 is provided, on whose inside face the inner cylinder sleeve 24 is guided in sealed, displaceable fashion; this piston 50 is surrounded on the outside by the annular cylinder 48. The annular cylinder 48 is sealed off from the outside face of the annular piston 50, and with the free end face of the annular piston 50, it defines an annular cylinder chamber 51.

The indexing disk 47 is connected to the annular cylinder 48 rotatably, but axially nondisplaceably, via slaving balls 52 inserted into suitable groovelike ball receptacles. On its facing plane faces, the indexing disk has two coaxial serrations 53, 54, disposed in annular regions; the shape and tooth pitch of these serrations corresponds to that of the respective opposed serration 45 and 46a on the receiving plate 13 and on the gear ring 46, respectively. The gears 53, 54 associated with the gears 45, 46a form locking means on the indexing disk 47, which represents a third locking part.

The cylinder chambers 23, 49, 51 of the reciprocating cylinder arrangement formed by the cylinder sleeve 24 and the annular cylinder 48 are connected to a controlled pressure medium supply device of the CNC machining unit via suitable pressure medium supply conduits, embodied in the workpiece carrier 1 and a rotary distributor represented symbolically reference numeral 55 in FIG. 3; this makes it possible to subject the cylinder chambers to pressure medium or to render them pressureless in programmed fashion.

The multiple-tool chucking device described thus far functions as follows:

For the exemplary embodiment, let it be assumed that the serration 53, on the top side of the indexing disk 47 toward the receiving plate 13—and the serration 45 associated with it on the underside of the receiving plate 13—have a tooth pitch of 5°, corresponding to 72 teeth. The serration 54 disposed on the opposite underside of the indexing disk 47—and the serration 46a associated with it on the gear 45—are assumed to be embodied with a tooth pitch of 4.5°, corresponding to 80 teeth.

Also, in the cylinder chamber 23, the effective annular area of the annular face 24b in the axial direction on the cylinder sleeve 24 is larger than the annular face 48a effective in the cylinder chamber 49 on the annular cylinder 48, and this annular face is in turn smaller than the effective annular face 51a on the annular piston 48 in the cylinder chamber 51. In the exemplary embodiment chosen, the ratios of the axially effective annular areas of these annular faces that are acted upon by the pressure media are 24b:48a:51a=4:1:2. When the cylinder chambers 23b, 48a and 51a are subjected to pressure medium that is at the same pressure, the forces exerted in the axial direction on the cylinder sleeve 24 and the annular cylinder 48 are in proportion to these axially effective annular faces.

In the normal operating state during the machining of the workpieces 14 clamped to the turrets 11, the cylinder chamber 23 of each of the turrets 11 is subjected to pressure medium. Thus relative to the piston 22 that it surrounds, the respective cylinder sleeve 24 is prestressed toward the longitudinal axis 3 of the workpiece carrier 1 with a predetermined prestressing force; as a consequence, that the serration 45 on the underside of the receiving plate 13 and the serration 53 on the top side of the indexing disk 47, and at the same time the serration 54 disposed on the underside of the loosely supported indexing disk 47, are all kept in engagement with the serration 46a on the gear ring 46 by this prestressing force. The cylinder chamber 51 is pressureless.

In this way, the receiving plate 13 is braced by positive engagement, via the indexing disk 47 and the gear ring 46, to the workpiece carrier 1, and the serrations assure highly precise positioning of the receiving plate 13 relative to the workpiece carrier 1.

After the conclusion of the machining operations on the workpieces 14, the turrets 11 must each be indexed onward about their respective axis of rotation 12 by equal angular values for the next machining step. It is assumed that the indexing step for the next operation is 0.5°.

In order to trigger this indexing step of 0.5°, beginning at the operating position of the axis of rotation 12 shown at the left and bottom in FIG. 5, the pressure of the pressure medium in the respective cylinder chamber 23 is lowered, while the cylinder chamber 49 is subjected to pressure. Accordingly, the cylinder sleeve 24 is moved outward relative to the piston 22 that it surrounds, until the serrations 45 and 53, on the underside of the receiving plate 13 and on the top side of the indexing disk 47, respectively, are brought out of engagement. The length of the stroke of the receiving plate 13 relative to the workpiece carrier 1 is limited by the fact that the annular face 24b of the cylinder sleeve 24 comes into contact with the opposite annular face 22a of the piston 22 that defines the cylinder chamber 23 (FIG. 7). Since the cylinder chamber 49 is subjected to pressure medium, the serrations 54, 46a on the underside of the indexing disk 47 and on the gear ring 46, respectively, remain in engagement biased toward one another, while the opposed serration 53 on the top side of the indexing disk becomes disengaged from the serration 45 on the underside of the receiving plate 13.

As the receiving plates 13 assume the position shown at the top in FIG. 5, in which they are freely rotatable about their axis of rotation 12, the workpiece carrier 1 is rotated about its longitudinal axis 3 by an angle that produces a rotation of each of the turrets 11 about their respective axis of rotation 12 of 5°. Since all the turrets 11, as already described, are coupled in driving fashion to the drive gear wheel 33 (FIG. 3) that is kept stationary, all the turrets 11 are rotated by the same angular value upon this rotation of the workpiece carrier 1 about its longitudinal axis 3.

After the conclusion of this rotary motion, the cylinder chamber 23 of each of the turrets 11 is again subjected to pressure medium. Since the axially effective area of the annular face 24b of the cylinder sleeve 24 is larger than the axially effective area of the annular face 48a in the cylinder chamber 49, the receiving plate 13 is moved inward, oriented toward the longitudinal axis 3 of the workpiece carrier 1, until the serrations, that is, serration 45 on the underside of the receiving plate 13 and serration 53 on the top side of the indexing disk 47, enter into engagement and lock the receiving plate 13 positionally fixedly and precisely against the workpiece carrier 1.

The cylinder chamber 51 is now subjected to pressure medium, while the pressure in the cylinder chamber 23 is lowered. As a consequence, the annular cylinder 48 executes a stroke motion oriented outward relative to the annular piston 50 that is rigidly connected to the workpiece carrier 1; in this motion, via the balls 52, it carries the indexing disk 47 along with it, so that the serration 54 disposed on the underside of the indexing disk becomes disengaged from the serration 46b on the top side of the gear ring 46. During this stroke motion of the receiving plate 13, the serration 53 on the top side of the indexing disk remains in firm engagement, with prestressing, with the serration 45 on the underside of the receiving plate 13 that is moving outward jointly with the indexing disk 47. This is assured by the provision that during this stroke motion, the cylinder chamber 49 is pressureless, and the annular face 48a of the annular cylinder 48 rests on the opposed annular face, the one defining the cylinder chamber 49, of the cylinder sleeve 24 (see FIG. 7).

Thus the receiving plate 13 is moved outward jointly with the indexing disk 47 until the serrations 46a, 54 are completely disengaged, and the terminal position shown on the right in FIG. 5 is reached, in which position the annular face 24b of the annular chamber 23 strikes the opposed annular face 22a of the piston 22. The workpiece carrier 1 is now rotated 4.5° back in the opposite direction from the above-described rotation of 5°, or in other words is rotated backward by one tooth pitch of the serrations 54, 46, whereupon the serrations 54, 46a are again engaged.

To this end, the cylinder chamber 23 is again subjected to pressure, so that the cylinder chambers 23 and 51 are under the pressure of the pressure medium. Since the axially effective area of the annular face 24b in the cylinder chamber 23 is greater than the axially effective area of the annular face 54a in the cylinder chamber 51, a motion of the receiving plate 13 and of the indexing disk 47 coupled to it ensues, oriented toward the longitudinal axis 3 of the workpiece carrier 1, in the course of which the serrations 54 and 46a, come into engagement with one another and are mutually locked.

By the two successive rotary motions described above, of 5° in one direction of rotation and then 4.5° in the other direction of rotation, the receiving plate 13 has accordingly been indexed onward by 0.5°. In each of these rotary motions, the intrinsically loosely supported indexing disk 47 has continued to have with its upper or lower serration 53 or 54, respectively, in positive engagement with the associated serration 45 on the underside of the receiving plate 13 and the serration 46a on the top of the gear ring 46, respectively. This assures that both in the stroke motion and in the rotary motion, the intrinsically loose indexing disk 47 is always pressed with prestressing against the receiving plate 13 or the gear ring 46 and, by means of the serrations that are kept in engagement, is kept locked in a manner fixed against relative rotation relative to the receiving plate 13 or the gear ring 46, respectively, so that it always has a controlled position, and a satisfactory angular setting is thus assured.

The two steps, performed successively as described above, for setting a resultant new rotary angle position of the turret 11 can also be performed in reverse order; that is, first the serrations 54, 46a can be put out of engagement as described, and the receiving plate 13 can be rotated by a predetermined rotary angle value in one direction of rotation and then, after the indexing disk 47 has been locked to the gear ring 46, the other serrations 45 and 53 can be unlocked, so as to rotate the receiving plate 13 by the desired angular value and then lock it again.

It is furthermore possible, in the two successive rotary motions explained for setting a new angular position, to rotate the turrets 11 in the same direction of rotation about the respective axis of rotation 12; that is, the rotary angle values traversed in the two rotary motions can either be added to one another or subtracted from one another.

To assure that all the turrets 11 will be perfectly locked, positionally correctly, against the workpiece carrier 1 before the tools begin their machining and thus before machining forces are exerted on the workpieces 14, the multiple chucking device includes a feeler device, which ascertains whether all the turrets 11 are satisfactorally locked via their serrations 45, 53 and 54, 46a.

This feeler device has feeler elements in the form of cylindrical feeler bolts or feeler slides 55, which are supported longitudinally displaceably in associated bores 56 of the workpiece carrier 1 that are coaxial with the bearing bore 21 of the respective turret 11. Each feeler slide 55 rests with its face end in contact with the bearing peg 20 of the associated receiving plate 13 and thus senses its axial position relative to the workpiece carrier 1. Each of the feeler slides 55, on its face end pointing inward into the workpiece carrier 1, has a formed-on sliding block part 57, which extends only as far as the respective longitudinal center plane of the feeler slide and occupies only one quadrant of the circular end face of the slide. The sliding block part 57 is provided with a continuous semicylindrical recess 58 (see FIG. 5), which extends perpendicular to the central longitudinal axis of the feeler slide 55.

When all the turrets 11 are in their lowered locking position relative to the workpiece carrier 1, all the feeler slides 55, each in groups of four feeler slides, are pushed together in the way visible in FIG. 5 such that their four semicylindrical recesses 58 add up to one continuous cylindrical bore, which is located at the point of intersection of the diagonals of the square cross-sectional shape of the workpiece carrier 1. A feeler rod 61 disposed displaceably in a longitudinal bore 60 of the workpiece carrier 1 that is coaxial to the central longitudinal axis 3, is coupled to an actuating cylinder 62 and arranged for axially adjusting the feeler rod 61 relative to the workpiece carrier 1. A position sensor, indicated symbolically at 630, issues a control signal to the controller of the CNC machining center, as a function of the axial position of the feeler rod 61.

If all the turrets 1 are properly locked, then the feeler rod 61 can be thrust into the workpiece carrier 1, whereupon the sensor 630 outputs a corresponding signal.

However, if one of the turrets has become stuck in the course of the locking operation, then the feeler rod 61, being hindered by the sliding block part 57 of the stuck feeler slide 55, cannot be thrust all the way in, and thus the sensor 630 reports the existence of an error state to its control unit.

Details of this feeler device are described in U.S. Pat. No. 6,185,802.

Finally, in addition to the indexing disk 47, further such indexing disks can be provided, which have locking means and in particular serrations, with different angular pitches, so that a practically arbitrarily fine subdivision of the indexing motion into angular increments can be attained. A major advantage of the novel chucking device is that it requires only little space, so that a plurality of these chucking devices can be combined into one multiple chucking device, in which as described, a plurality of turrets 11, distributed over a plurality of planes, are disposed on one common workpiece carrier. In the exemplary embodiment described, for all the turrets 11, the rotary motion required for positioning the turrets is derived from one rotating NC shaft, making for a very economical embodiment. The indexing disks 47 require neither additional drive devices of their own nor associated control means. The chucking device assures a highly precise, stable positioning of the workpieces, and a change in the respective position in small angular increments (less than 1°, for instance) is readily possible. In cases where it appears necessary, the drive gear wheel 33 (FIG. 3) can also be rotated by the geared motor 38 relative to the workpiece carrier 1, in order to achieve an additional rotation of the turrets 11 about their respective pivot axes 12 that is independent of the rotation of the workpiece carrier 1 and its longitudinal axis 3.

The simple, closed design of the novel chucking device is furthermore a prerequisite for use in critical areas, of the kind often encountered in metal machining because of the effect of coolants, oils, grinding dust, changing temperatures, chips, and the like.

We claim:

1. A chucking device, in particular for workpieces that are to be machined on more than one side, having:
    a workpiece carrier (1),
    at least one turret (11), arranged to receive workpieces, which is supported, rotatably about an axis of rotation (12), on the workpiece carrier (1),
    a positive-engagement locking device, associated with the turret (11), on the workpiece carrier, by which locking device the turret (11) can be locked positionally precisely in a predetermined rotary angle position relative to the workpiece carrier (1), wherein the locking device has the following:
    at least three locking parts (13, 47, 46) coaxial to one another, of which a first locking part (13) is solidly connected to the turret (11) and a second locking part (46) is solidly connected to the workpiece carrier (1), and at least one third locking part (47) is disposed between the first locking part (13) and the second locking part (46) and is supported rotatably relative to the workpiece carrier (1), and all the locking parts, on the plane faces facing one another, each carry pairs of cooperating locking means (45, 53; 46a, 54), which can be brought into and out of engagement with one another by means of an axial relative motion of the locking parts;
    actuating means, in order to bring the locking means of the locking parts selectively into and out of engagement in such a way that the at least one third locking part (47), via its locking means, always remains locked with at least one locking part adjacent to it; and
    a drive device, which is coupled to the turret (11) and by which the turret is rotatable by a predetermined angular value about its axis of rotation (12) when the locking means are released.

2. The chucking device of claim 1, wherein the locking means each comprise a serration (5, 53; 46a, 54).

3. The chucking device of claim 1, wherein the locking means (45) of the first locking part (13) and the locking means (53), associated with them, of the second locking part (47) have a different angular pitch from the locking means (46a) of the second locking part (46) and the locking means (54), associated with them, of the third locking part (47).

4. The chucking device of claim 1, wherein the at least one third locking part (47) is supported loosely between the first and the second locking part (13, 46).

5. The chucking device of claim 1, wherein the turret (11) has a spur gear (25) or is connected to it in a manner fixed against relative rotation, by way of which spur gear it is coupled by positive engagement with gear means (26, 31) of the drive device (33).

6. The chucking device of claim 1, wherein the actuating means have a reciprocating device, by which the first and/or second locking part (13, 46) and/or the at least one third locking part (47) are axially adjustable relative to one another.

7. The chucking device of claim 6, wherein the reciprocating device is pressure-medium-actuated.

8. The chucking device of claim 7, wherein the reciprocating device has at least two reciprocating cylinders (24, 48), subjectable to pressure medium and coaxial with the axis of rotation (12), which are supported axially adjustably relative to the workpiece carrier (1), and of which one reciprocating cylinder (24) is coupled to the first locking part (13) or the second locking part (46), and another reciprocating cylinder (48) is coupled to at least one third locking part (47).

9. The chucking device of claim 8, wherein the one reciprocating cylinder (24) is coupled to the first locking part (13) or second locking part (45), and the other reciprocating cylinder (48) is coupled to the associated third locking part (47), in each case rotatably but axially nondisplaceably.

10. The chucking device of claim 1, wherein the at least one third locking part is embodied as an indexing disk (47), which on each of the two opposed plane sides carries a respective locking means (53, 54).

11. The chucking device of claim 1, wherein the at least one third locking part (47), when the locking relative to the first locking part or second locking part (13, 46) is released, is kept locked to the respective other locking part.

12. The chucking device of claim 1, wherein the workpiece carrier (1) is designed as polygonal in cross section and has at least two chucking faces (2) extending parallel to its longitudinal axis, and at least one turret (11) is disposed on each chucking face.

13. The chucking device of claim 12, wherein on each chucking face (2) of the workpiece carrier, there are at least two turrets (11), having respective pivot axes which are located in a common plane that includes a central longitudinal axis of the workpiece carrier.

14. The chucking device of claim 12, wherein the drive device has one common drive source for all the turrets (11), with which source a gear means of the turrets (11) are coupled by positive engagement.

15. The chucking device of claim 14, wherein the common drive source has a central drive gear wheel (33), with which the gear means are in engagement; the workpiece carrier (1) is rotatably supported in bearing means about its central longitudinal axis (3); and the drive gear wheel (33) is rotatably fixable relative to the bearing means.

16. The chucking device of claim 14, wherein the common drive source is controllable independently of the rotary motion of the workpiece carrier (1) about its longitudinal axis.

17. The chucking device of claim 2, wherein the locking means (45) of the first locking part (13) and the locking means (53), associated with them, of the second locking part (47) have a different angular pitch from the locking means (46a) of the second locking part (46) and the locking means (54), associated with them, of the third locking part (47).

18. The chucking device of claim 2, wherein the at least one third locking part (47) is supported loosely between the first and the second locking part (13, 46).

19. The chucking device of claim 13, wherein the drive device has one common drive source for all the turrets (11), with which source a gear means of the turrets (11) are coupled by positive engagement.

* * * * *